March 26, 1963 J. W. HALPERN 3,082,974
MESSAGE TRANSMISSION PLANTS
Filed April 19, 1957 8 Sheets-Sheet 1

INVENTOR
JOHN W. HALPERN
BY Munie and Munley
ATTORNEYS

March 26, 1963  J. W. HALPERN  3,082,974
MESSAGE TRANSMISSION PLANTS
Filed April 19, 1957  8 Sheets-Sheet 8

INVENTOR
JOHN W. HALPERN
BY *Irvine and Smiley*
ATTORNEYS

United States Patent Office 3,082,974
Patented Mar. 26, 1963

3,082,974
MESSAGE TRANSMISSION PLANTS
John W. Halpern, Stockholm, Sweden (% A/S De Forenede Patentbureauer, Vesterbrogade 31, Copenhagen V, Denmark)
Filed Apr. 19, 1957, Ser. No. 654,042
Claims priority, application Great Britain Apr. 20, 1956
3 Claims. (Cl. 243—16)

The present invention relates to a message transmission of the type comprising a system of transmission tracks including a main line and a plurality of branch lines and sub-branch lines, means for supplying a transport medium to convey a message carrier along the tracks, and means for controlling the passage of said carrier from a point of dispatch to a point of reception.

A message transmission is already known in which two or more carriers for messages can be dispatched along annular tracks to any predetermined point therein, without disturbing the passage of one and another. If such carriers are provided with automatically operating selection members, they can actuate diverters by means of which the main line is connected to branch lines leading to receiving stations. Such an actuation may take place within a short period prior to the arrival of the carrier to the diverter. In such known transmission plants several carriers may simultaneously travel along the track destined for different stations. Such a transmission plant has a considerable traffic capacity. In many instances, however, there may be needed only a relatively small traffic capacity for which a plant of above type would be unnecessarily complex and too expensive.

The object of the present invention is to provide a message transmission which is suitable for a relatively small traffic, and which is simple in construction, so that it is easy to operate and cheap in manufacture.

According to the invention the track is provided with switching means in the proximity of each branch line or sub-branch line, which switching means are actuated by the carrier during its travel along the track to alter its direction of motion, and to regulate the speed and direction of motion of the transport medium, all in accordance with a predetermined routing schedule.

By this arrangement it is possible at each branch line or sub-branch line to employ only a single branch track for dispatch as well as reception of a carrier. Thus the entire plant is essentially simplified in construction in comparison to hitherto known transmission systems.

In hitherto known transmission systems of the type described there are required two diverters for each station. An object of the invention is to further simplify the construction by rendering necessary the employment of a single diverter only at each station.

A further object of the invention is to simplify the construction by substituting the hitherto employed full automatic devices for selection of destination of the carrier by manually operated devices such as press buttons or dials.

A still further object of the invention is to render possible the employment of carrier members not provided with selective members.

These, and other objects of the invention will be apparent from the following specification taken in conjunction with the accompanying drawings, of which

Figures 1, 2:
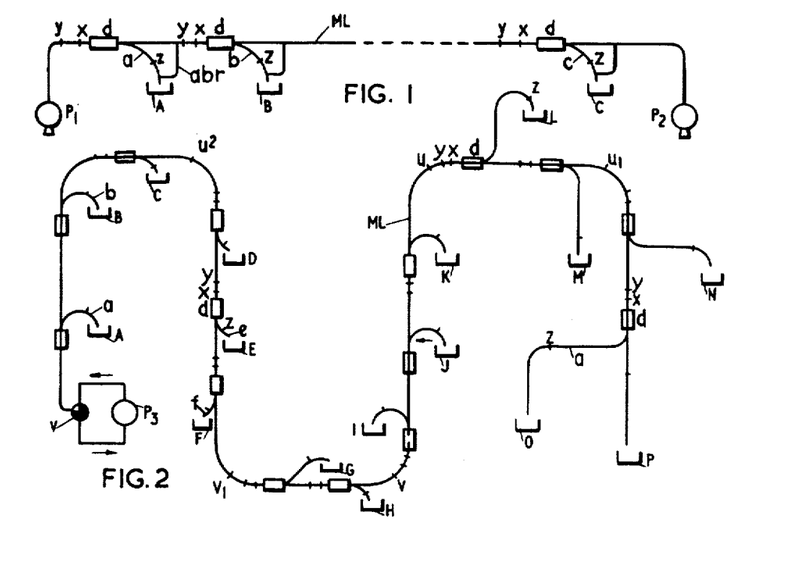
FIGS. 1, 2 and 3 illustrate schematically three examples of message transmissions according to the invention.

The diagrammatically illustrated system shown in FIG. 1 is a single tube line generally indicated by ML. The main line ML is provided with a number of station branch-lines $a$, $b$ and $c$, each terminating in a station indicated by A, B and C respectively. At each end the line ML is connected to a suction pump $P_1$ and $P_2$ respectively. Each station is provided with three electrical switches indicated by $x$, $y$ and $z$, of which switches $x$ and $y$ are inserted in the main line ML, and $z$ in the branch lines $a$, $b$ and $c$. D is a diverter unit for each station provided with an internal guide tube which gives passage to the air stream and the carrier either from main-line to mainline, or from main-line to branch-line. Each station is furthermore connected to the main-line ML through an auxiliary air branch tube $abr$.

This system operates in the following manner: Presuming station A wishes to send a message to station C, the sender at A presses the selector button for C, or dials the number of station C, after having inserted the carrier with the message in the opening of the branch tube $a$. When the selector button is pressed down, or when the dialling is completed, and if the main line ML is free, which is indicated by means of a green light, pump $P_1$ starts operation causing the diverter D at station A to swing its internal guide tube to direct a suctional air flow through branch line $a$, by means of which the carrier inserted in the opening of this branch line is drawn up into the main line ML moving in direction of pump $P_1$. When the carrier passes switch $x$, which is a junction switch, the diverter guide tube is returned to its initial position, internally connecting mainline to mainline. When arriving at switch $y$ the carrier actuates this to either stop the pump $P_1$, or to actuate a regulator valve diverting the pump connection from the mainline. At the same time pump $P_2$ at the other end of the line ML is started, or if continuously running is connected to the mainline, causing the internal guide tube of the diverter D at station C to communicate with the branch line $c$. As a consequence of this new setting the carrier, which hitherto has been moving in the direction of pump $P_1$, comes to a halt, reverses its direction of movement and passes along the mainline, until it reaches station C where it enters branch line $c$ and is ejected therefrom. As the carrier passes switch $z$ in station C, it actuates the switch to either stop pump $P_2$, or divert it from the mainline. The system is now ready for renewed transmission of carriers.

FIG. 2 illustrates diagrammatically a modification of this system, according to which the utilisation of the same principle as disclosed above is possible by employing only a single pump $P_3$ in connection with a two-ended mainline ML. The pump has attached thereto a two-way valve V by means of which the mainline ML may be alternatively connected to the pump inlet, or to the pump outlet, to produce either suction or pressure in the mainline. The two-way valve, or if desired several two-way valves, are arranged for remote control to produce in the mainline alternative conditions, e.g. full force pressure, half-throttle pressure, full-force suction, or half-throttle suction. As in the former system this type of transmission is provided with a number of stations designated by capital letters from A to P. Each station is connected to the mainline through branch lines, e.g. branch line $a$ for station A, branch line $b$ for station B etc. Furthermore, for each station there are provided switches $x$, $y$ and $z$. It will be obvious that the reception of a carrier can only take place when the mainline ML is connected to the outlet side of the pump P, while dispatching a carrier requires connection between the mainline and the suction side of the pump set at full suction force.

This system operates as follows: assuming station O wishes to send a message to station E, pumps P will start at full suction drawing the carrier out of branch line $o$ into mainline ML. When the carrier reaches a switch $u$ (at the top of the vertical drop in line ML), this switch is acuated to change the pump P from full suction force to half-throttle pressure force, causing the carrier to drop slowly until it reaches switch $v$, which is actuated to change operation of the pump to full suction force. The carrier is lifted through the upright part of line ML until it reaches switch $y$ belonging to station E. This switch is actuated to adjust the pump to either a gentle pressure or to no air flow, or preferably to a moderate suction force. Since as earlier described switch $x$ of station E has actuated the diverter $d$ of station E to connect the mainline with branch line $e$, the carrier will slowly reverse its direction of movement and slide gently into the receptacle of station E. This flexible flow system renders dipossible the utilisation of carriers of relatively large diametre and heavy construction without risk of undue knocks or disturbing noises when landing at a station.

For dispatching a carrier in the opposite direction, e.g. from station E to station O, the sequence of conditions would be as follows. Presuming mainline ML is free, and local dialling completed, pump P would be set at full suction force, and diverter $d$ for station E would turn its internal tube guide to communicate with branch tube $e$. The carrier inserted in station E would be rapidly lifted into mainline ML, and upon actuating switch $x$ of station E the diverter guide tube would be returned to its mainline-to-mainline position. Upon the subsequent actuation of switch $y$ of station E the pump would be adjusted to a so reduced flow that the carrier is permitted to drop by gravity with a reasonable speed. Upon reaching switch $v$ in the lower part of the mainline, actuation by the carrier of this switch will alter operation of the pump to fullforce pressure, and at the same time the diverter $d$ of station O would be actuated so that its guide tube is connected with branch line $o$. Upon reaching a switch $u^1$ in the upper part of mainline ML, e.g. at the roof of a building, the carrier will actuate this switch to change the pump to quarter-throttle suction, and the carrier will gently drop into the receptable of station O. While the carrier passes by switch $z$ in branch line $o$ the switch is actuated to terminate the operation of the pump, and the mainline ML is ready for another transmission. Instead of switch $u^1$ the electrical memory system of the carrier may be adjusted to cause operation of the tube guide in diverter $d$ of station O.

Figure 3:
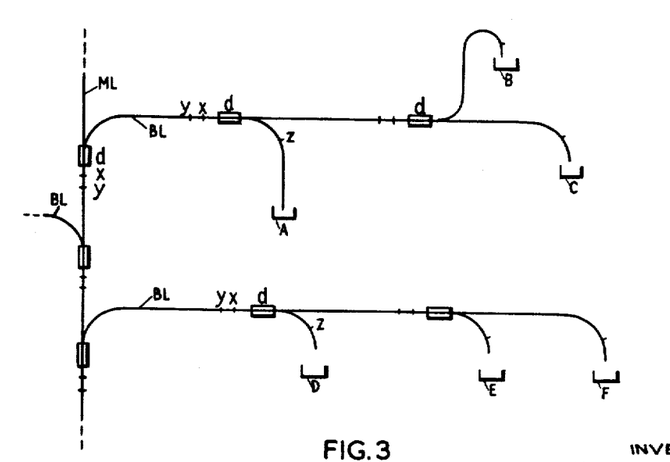

In FIG. 3 the vertical mainline ML is provided with a number of branch lines BL which do not end directly into stations but are extended to any convenient length horizontally. Each branch line BL may be provided with any number of diverters $d$ in connection with branch lines each leading to a station, e.g. stations A, B and C in the top branch line BL and stations D, E, F in the bottom branch line BL. The control system would be substantially the same as explained in connection with the foregoing examples, though in some instances two branch diverters $d$ would be actuated simultaneously for sending or for receiving purposes.

The general idea of an electrical control system will now be described in conjunction with FIG. 4. This shows for instance station K of FIG. 2, but it is assumed that any number of stations may be included in this vertical branch. The station shown in FIG. 4 would be the fourth reckoned from below, and there would be at least three more stations above it.

Figure 4:
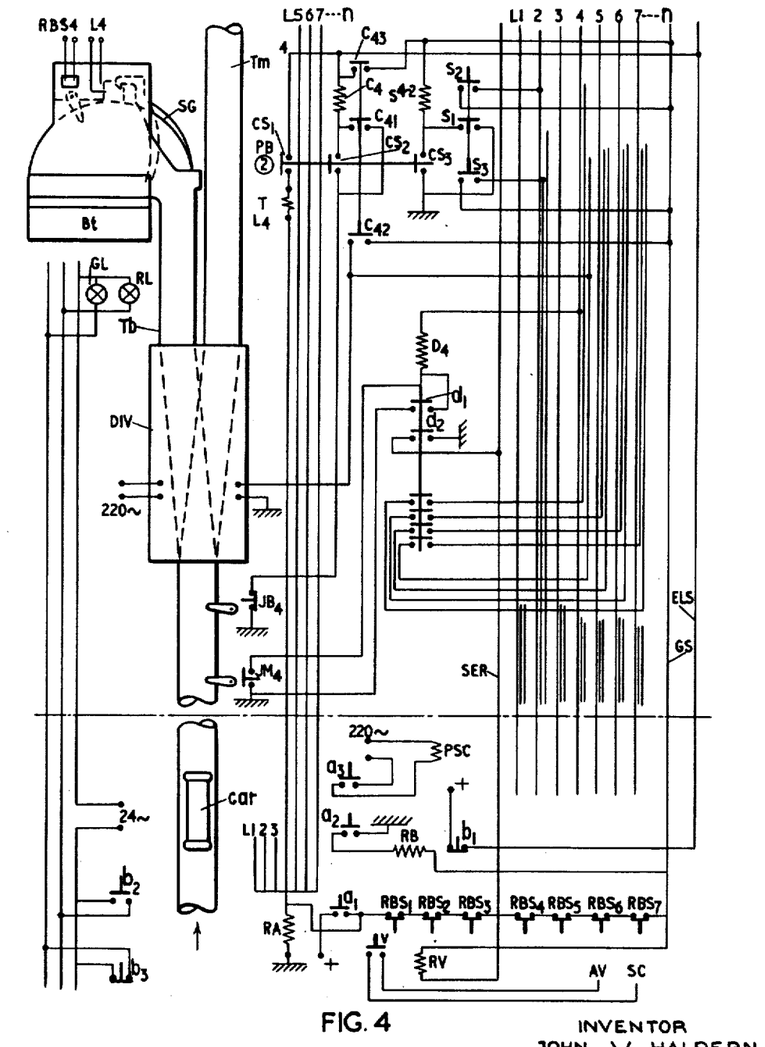
FIG. 4 is an example of a diagram for the electrical controlling members intended for use in connection with any one of the transmissions shown in FIGS. 1–3, FIGS. 5 and 6 show the general planning of two other types of transmission plants according to the invention.

The general idea of an electrical control system may now be explained by means of an example, FIG. 4, showing for instance station "K" in FIG. 2, but assuming that any number of stations 1, 2, 3 . . . $n$ may be included in this vertical branch. The station shown on the drawing would be the fourth one counted from below, and there would be at least three more stations above.

$L_{1,2,3...n}$ are receiving selector lines. $Tm$ is the main tube line, $Tb$ the branch tube line, DIV the diverter unit with its two guide tube positions indicated by interrupted lines. $Bt$ is a receiving basket, SG is a gate rail which can be displaced as indicated, provided an electrical lock, also shown by indication, is unlatched.

$RBS_4$ is the receiving brake switch, $JB_4$ is the junction break switch, and $JM_4$ is a junction-make switch at station No. 4, and they correspond to switches $x$, $y$, $z$ respectively in FIG. 1.

Each station has a press button selector box PB. The drawing shows one such button for the preselection of station No. 2. The button is physically connected to three pairs of closing connectors $cs_1$, $cs_2$ and $cs_3$. The first pair $s_1$ will upon pressing the selector button, close a circuit from a ring supply marked ELS, on the right hand side of FIG. 4, through the electric lock of the local station and through the relay RA situated in the control box common to the whole plant.

Upon closing a contactor $a$, the relay RA puts voltage on the other ring line GS (general supply line) and this keeps the relay RA energised. A contactor $a_2$ energises a relay RB and a contactor $a_3$ switches on the starter coil PSC of the pump. A contactor $b_1$ of relay RB breaks the voltage supply to the "electrical lock" line ELS, thereby making it impossible for any other station to unlatch its sending guard. At the same time, the contactors $b_2$ and $b_3$ on the left hand side of FIG. 4 change over, causing green lights GL at stations to extinguish, and red lights RL to come on.

The pair of contacts $cs_2$ of the press button PB for station No. 2 will when closed switch a current through the relay C. The purpose of this relay is to energize the diverter unit DIV of the same station, and to keep it in its diverted position until the break contactor $JB_4$, when actuated by a passing carrier car. after sending, breaks the holding current across contactor $c_4'$.

The third pair of contacts $cs_3$ serve to close a relay $S^{4-2}$, i.e. the selector relay at 4 causing reception at station 2. There is a holding contactor $s'$, for relay $S^{4-2}$, and contactors $s_2$ and $s_3$ which connect to triple selector lines No. 2. Each station has coordinated such triple wires in the multiple control cable running parallel with the main tube line. Contactor $s_2$ connects one of the triple lines which in turn connects to a relay $(D_2)$ in the control box at station 2, which relay is not shown but is congruent in function with $D_4$ of station No. 4, shown in FIG. 4. The holding contactor $d'$ of relay $D_2$ in station No. 2 keeps it energized after being operated upon by means of switch $JM_2$ (not shown) when the carrier drops down below the level of the diverter of station No. 2. The other contactor $d''$ of the relay $(D_2)$ in station No. 2 switches voltage on to the servo line SER for the servo system on the air valve AV, causing a gentle air-flow upwards to be turned into a powerful air-flow upwards. Consequently the carrier, still dropping in the main line, will now be thrown upwards the diverter unit into the station branch of station No. 2 and be received there.

Contactor $s_3$ of the relay $S^{4-2}$ at station No. 4 connects to a second wire of the triple line 2 which goes to one of the relay contactors of the relay $(D_2)$ in station No. 2, and the third wire connects to the diverter unit of station No. 2. Contactors $s_2$ and $s_3$ do not necessarily connect to wires of the same triple line group. For example, the connection at the selector button for station No. 7 would be so that $s_2$ connects to the first wire in triple line 4, while $s_3$ would connect to the middle wire in the triple line 7, which combination would cause the carrier to rise as soon as relay $D_4$ is switched on after contactor $JM_4$ closes, and furthermore, since one of the D contactors transmits voltage to the third wire of the No. 7 triple line, the diverter at station No. 7 would change over, ready to receive the rising carrier at this station.

When any of the receiving switches $RBS_{1,2,3\ldots n}$ breaks, since they are all in series, relay RA falls off, therefore also relay RB and relays S and D fall off. Red lights at all stations change to green light, and sending becomes possible again from any station.

In FIG. 4 only one servo-control line SC for the pump valve is shown. In the example here described the only control of the flow required would be a change from moderate blowing to full throttle blowing.

For such control valve positions as would also cover the flow conditions: "partial suction" and "full suction," one or two additional servo control wires must be reserved in the cable. However, the principle of connecting these control wires to contactors of selector press buttons and local carrier operated relay D is the same as described.

Not all stations need have gates with electrical locks. Stations with tube branches pointing upwards, see FIG. 6, would not need gate bars with electrical locks, since a carrier cannot be sent upwards without an air flow and no air flow is possible unless the corresponding diverter unit switches its internal tube guide into the station branch. The sending relay C in the press button selector box is, however, disconnected from the voltage supply as long as another transmission is taking place. Therefore, there is no possibility of introducing a carrier into the system prematurely, even without a mechanical bar and lock.

An electrical control system such as described may of course be varied in that the memory relays, i.e. relays holding a selector position and waiting until the carrier arrives at a predetermined position during its passage along the tube line, are mounted at the receiving station control box instead of at the sending station, or at some central unit common to some or to all stations. The general principle described, however, remains, and it causes a simultaneous change in the pump flow conditions and in the position or positions of one or more flow-carrying branch-off units or diverters, which change is prepared by electric or magnetic memory elements and released by the moving carrier itself, for purposes as described.

Figure 5:
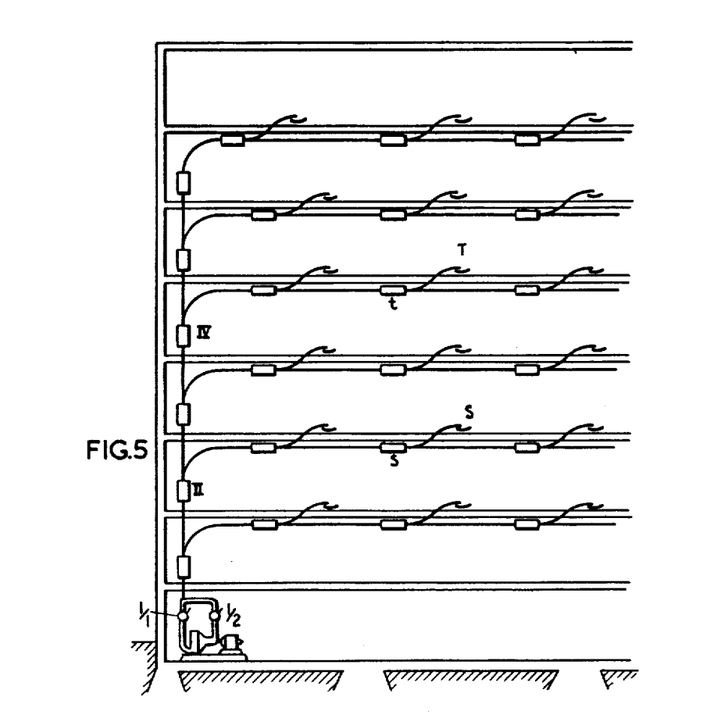
Figure 6:
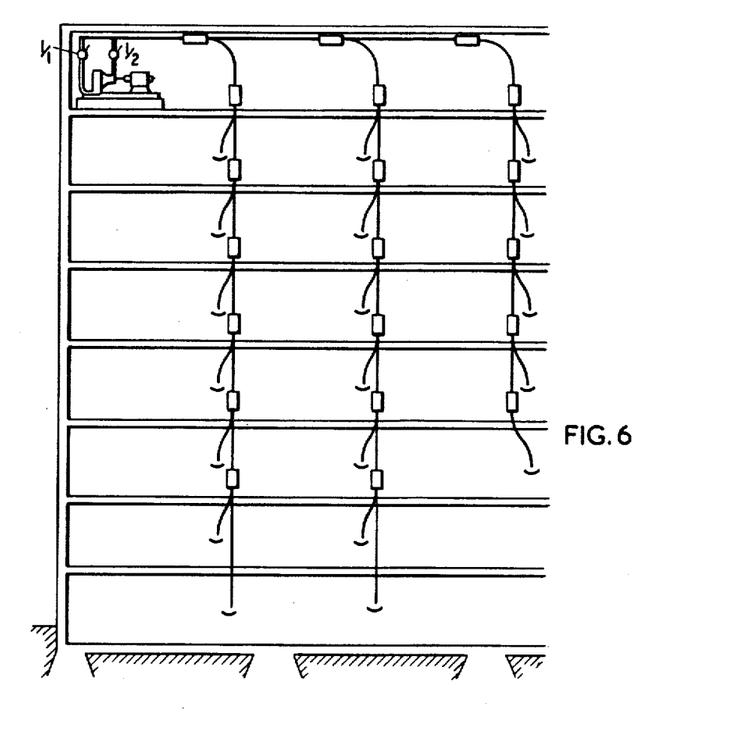

FIGURES 5 and 6 show that the above described principle of single tube operation is not restricted to one-dimensional connections between stations. By means of side branches serving as sub-artery lines, a large number of stations attached to a branched tubular system can be served and can intercommunicate over the shortest possible distance.

FIG. 6 does not distinguish itself from FIG. 5 as far as the pneumatic method of operation is concerned. In both cases each of the stations shown can send to another pre-selected station in such a manner that the carrier takes the shortest route.

Figure 10:
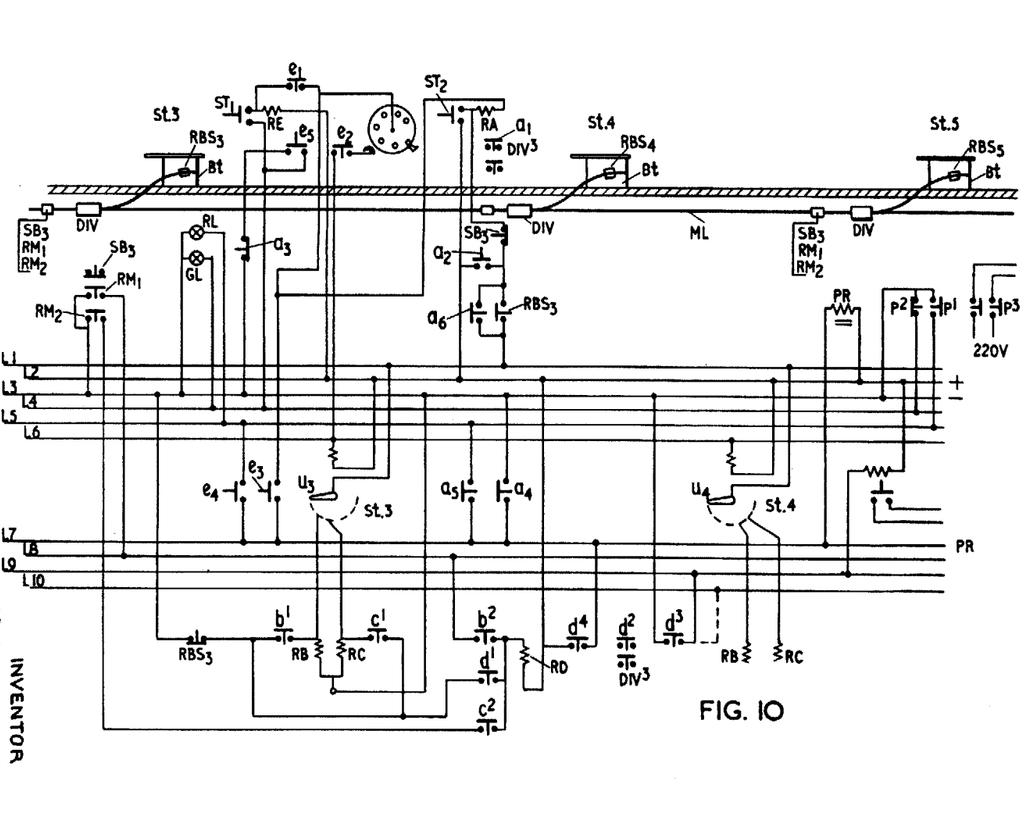
FIG. 10 is a diagram of the electrical equipment required for operating transmission plants as shown in FIGS. 5 and 6.

FIG. 10 shows a part view of FIG. 5 on an enlarged scale, showing the interconnection of three stations $St.3$, $St.4$ and $St.5$ in one of the floors of the building. Added are the electrical connections between the stations and the pump house with its servo valve elements.

ML is the horizontal tube line at ceiling level. DIV is the diverter gate unit at each of the stations (see also the drawing and description FIG. 9) and B$t$ are the receiving baskets near the writing desks of the offices. RBS are receiving line switches, which are break contactors operated by the carriers when passing through a tube branch line at point RBS. At the left of each diverter DIV is a line switch containing three individual electrical switch elements, namely SB, a break-contactor breaking current when a carrier passes by, RM, a make-contactor, and RM'', also a make-contactor.

The electrical equipment may be imagined to be contained inside a little apparatus box mounted near the desk. It would contain:

A telephone dial and the following five relays—
    Relay RA a sending relay (sending-start relay)
        RB a receiving selection relay
        RC another receiving selection relay
        RD a diverter relay
        RE a selection start relay, and a uniselector or similar electromechanical or electronic step switch.

A telephone cable with ten lines numbered $L_{1-10}$ connects all stations and diverter unit points.

A person wishing to transmit a message from $St.3$ to a particular point would lay the carrier into the tube and then dial the wanted station. To start with, he must press a button ST' causing the dialling system to be electrically connected to the transmission selector line $L_6$. At the same time green light GL at all other stations change to red light RL and these other stations are prevented from interfering. The wanted number is now dialled, and then button ST2 is pressed. After this, the carrier already inserted in the tube starts its journey. A fraction of a second before the carrier arrives at its destination, the red lights at all stations change to green light, and the system is ready to pass a new transmission.

This brief description is now explained in further detail. When the start button ST' is pressed, relay RE is energised. This relay has three make-contactors of which contactor $e'$ is a holding contactor, $e^2$ serves to connect the dial-system to the cable line $L_6$, while the only purpose of contactor $e^3$ is to isolate a connection to the relay RA in its non-operative position, from the control line $L_7$ at the end of which is the pump starter relay PR with its pump starter control contractors $p^3$ and warning lamp change over contactors $p^2$ and $p^1$.

As soon as button ST' is pressed the pump starts operation, and green light changes to red light at all stations. Line $L_4$ having lost its voltage prevents that any subsequent pressing of a button ST' would have an effect on the transmission already in preparation.

Next the operator sends pulses over the selector line $L_6$ by dialling the number of the wanted station. The uniselector switches of all stations follow the same movement, but only at one particular station would there be a connection to a selector relay at the end position of the wiper and this particular station is of course the wanted station. Now the operator presses the sending-start button ST2 whereby the positive voltage is put on line $L_1$ and thus closing a circuit through relay RB or RC. This would also bring a relay RD in, which has several functions to fulfill, among which is the energising of the diverter unit DIV at the wanted station, at a moment of time dependent on the movement of the carrier.

The need of two differently connected selector relays RB and RC will be explained.

When the selected distant station lies to the right of the sending station (FIG. 5 or 10) the routing condition is that the carrier must reverse its movement as soon as it has been drawn through the station branch and its gate unit, i.e. as soon as it reaches the main tube line. This is obtained by means of the line switch RM' which is in series with a relay contactor $b^2$. If both contactors $b^2$ and RM' are closed, relay RD is energised and held by holding contactors $d^1$. Contactors $d^2$ energise the control relay RC, in FIG. 9, which is placed inside the diverter unit DIV at the station. Moreover, contactors $d^3$ put voltage on the control line $L_9$ causing the suction valve at the pump to be closed and the blowing valve to be opened. $d^4$ connects to line 7 to keep the starter in "on" position, in spite of the fact that the relay RE drops off after the break contactor $a^3$ of the relay RA interrupts supply through $e^1$.

With the reversal of the air flow the carrier also reverses its movement until it emerges at the wanted station. The contactor RBS, when opened by the passing carriers, causes all built-up circuit conditions to collapse, red light changes to green light, and the system is ready for a new transmission.

When the receiving station lies to the left of the sending station, the carrier will obviously, after being sent off by means of suction force, continue to be drawn to the left until it reaches and has passed the diverter of the wanted station. Only then may the direction of movement of the carrier be reversed simultaneously with the named diverter gate being switched into the station branch tube of the selected station, causing the carrier now to be blown out of the system.

To obtain this postponed operation at a pre-selected point contactor $RM_2$ is provided. As FIG. 10 shows this is in series with the contactor $c^2$ of relay RC. If both $RM_2$ and $c^2$ are closed, relay RD is energised, thereby closing the different circuits already discussed.

Should the air propelling conditions required in the second case have to be different from those for the first case, another relay RD' may have to be used so as to connect a contact pair $d^3$ to another pump valve control line, say line $L_{11}$ or $L_{12}$ (not shown).

Control line $L_{10}$, for example, may serve to set the suction valve to half throttle, keeping the blowing valve closed. A line $L_{11}$ would close the suction valve completely and open the blowing or pressure side of the pump at half throttle. A line $L_{12}$ may serve a further intermediate flow adjustment, if needed or desired.

The wiper position on the step switches or uniselectors may e.g. be of the type where the built-up position breaks down as soon as a current passes through an auxiliary coil. Such a coil could be energised by a contactor on relay RB, or RC, or RD.

For the purpose of transmitting from one floor of a building to another (FIG. 5 or 6) the preselection of more than one diverter gate unit would be needed, each triggered at different times of the transmission cycle by the moving carrier itself.

For this purpose the dialling function would be so as to preselect also the required intermediate diverters approximately in the same manner as is described for the diverter of a receiving station.

For example, when sending from station S to T, FIG. 5, diverter II must be switched on first, and be held until the carrier has passed diverter II in the direction of the pump. A line switch below diverter II will cause the diverter to be returned to normal, the pump valve V2 to be opened, and the diverters IV and $t$ to be switched into branch position. When the carrier passes through station T, the pump stops and the diverters IV and $t$ return to normal.

From this description it is clear that there must be a greater number of dialling numerals than there are stations in the system, since one and the same station, when dialled from different points, would require different calling numbers. The non-uniformity of the directory may be considered a disadvantage, but since directory tables may easily be affixed at mailing points, this disadvantage may after all not be considered serious.

Finally, details are given about the construction of diverter units which must fulfill specific functions to make possible the above described transmission method. One of the important conditions is that the diverter unit must allow a carrier to pass equally well in both directions and in both positions of the internal guide tube. Furthermore, in both guide tube positions there should be perfect continuity of the cross section without a leak into the surrounding space.

Figure 7:
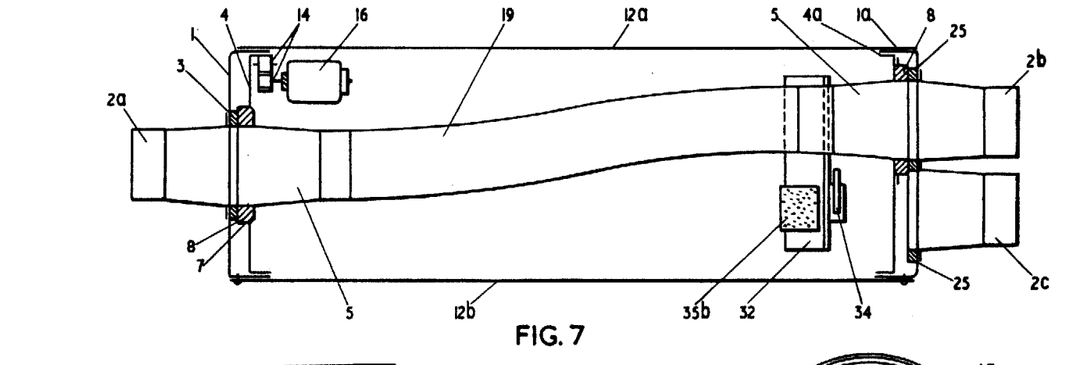
FIG. 7 is a longitudinal section through a diverter unit according to the invention.
Figure 8:
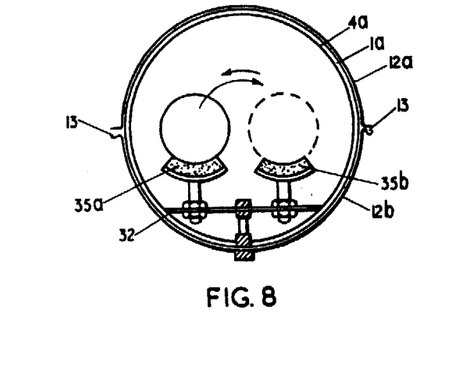
FIG. 8 is a cross section through the unit shown in FIG. 7.

Two half cylinders, $12a$, and $12b$, FIGS. 7 and 8, are clamped together by means of screw-clamps 13 to form a cylindrical shroud, with ends 1 and $1a$ on the left and right hand sides respectively of FIG. 7. One half-cylinder, for example $12a$, may be detachable so as to facilitate servicing of the interior parts. Inside the shroud there is a double-bend tube 19 with at each end a slightly conical end piece 5 and a soft rubberbonded ring 8. On to the outer side of each of these rings 8 is pressed a cupped part 4 and $4a$ respectively. The front faces of the rubber rings 8 slide on a ground steel ring 3 and 25 respectively when the tube rotates on the axis of the system, and its function is merely to produce an air-tight contact between the abutting parts. The pressed cups 4 and $4a$ are rubber-bonded upon rings 8 and conical parts 5 of tube 19.

When a motor 16 arranged within the cylinder rotates its rotary movement is transmitted to the cups 4 by means of driving and pressure wheels 14.

Whereas on the left hand end of the shroud there is only one slightly conical, tubular piece $2a$, there are two such tubular pieces $2b$ and $2c$ arranged side by side close to each other on the right hand end.

In its neutral position the internal double-bend tube 19 would coincide with say tube outlet $2b$. An adjustable felt pad $35a$ would ensure correct end position. When the motor is switched on, the internal tube 19 would rapidly revolve 180°, or any other suitable angle, and would be stopped by felt pads $35b$ just opposite the tube outlet $2c$. After each operation the motor is de-energized by means of micro-switches 34, FIG. 9, of which there are two, one being actuated when the double-bend tube 19 reaches its end position.

Figure 9:
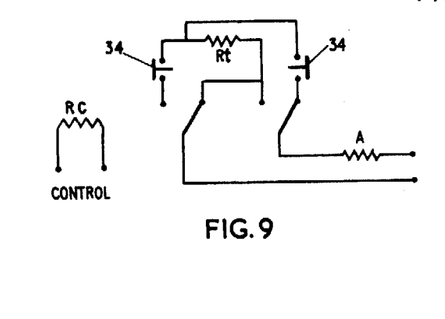
FIG. 9 is a diagram of the wiring employed in connection with the diverter unit shown in FIGS. 7 and 8.

The function of the switches 34 is apparent from FIG. 9. A control relay RC, which is connected to the relay contacts of relay RA or RD in FIG. 10, has two changeover contactors. The rotor $Rt$ and the stator are connected to the local power supply, as shown. In the position shown no current passes through the motor since the right hand switch 34 interrupts. When relay RC pulls and changes over, current flows and the motor rotates until the system of the diverter reaches the other end position in which it opens the left hand switch 34, whereupon the motor is de-energized. When RC falls off, the procedure is reversed, the motor rotates in the opposite direction until switch 34 on the right hand side is opened, i.e. is in its initial starting position.

Figure 11:
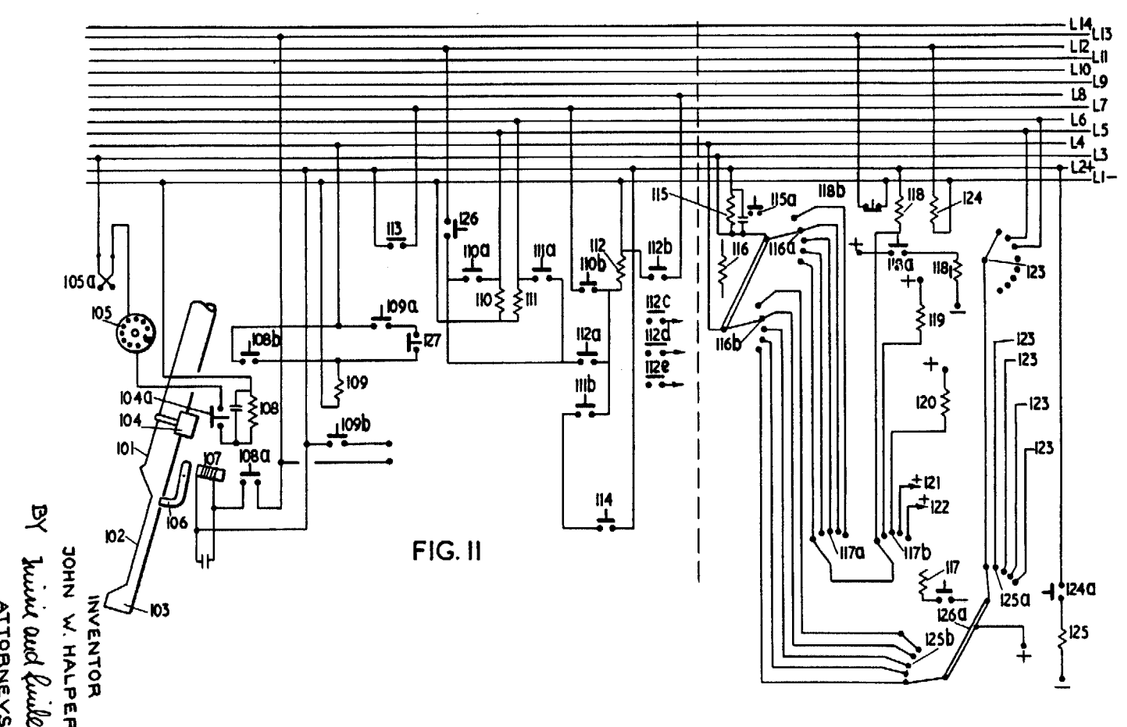
FIG. 11 is a diagram for a self-storing transmission control circuit.

FIG. 11 shows schematically an example of a self-storing transmission control circuit. The part on the left hand side of the vertical broken line represents the station-owned material, while the part to the right of the broken line represents the essential elements of the central control unit, hereinafter called the exchange.

In FIG. 11, 101 represents the station branch tube coming from a diverter junction. 102 is in the open part thereof through which a carrier may be despatched or received. 103 indicates an interiorly buffered end of the branch tube receiving and stopping an incoming carrier. 104 is a sending line switch provided with a pair of closing contactors linked to an arm protruding into the tube interior (not shown). 105 is a pulse-giving disc, e.g. a conventional telephone dial. 106 is an armature for an electromagnet 107, and 108 is a relay in series with the dial system 105.

$L_1$ til $L_{14}$ indicate cable lines. 109 is a relay which is energized through cable line $L_4$ from the the exchange. $109a$ is a holding contactor and $109b$ is another contactor by means of which the control circuit to the local diverter unit is closed. Relay 110 is a receiving-preparing relay which, pending arrival of the carrier at a line switch positioned behind the diverter junction of the sending station, energizes a receiving relay 112 which in turn operates receiving diverters of the local station. Relay 111 is another receiving-preparing relay which, pending the arrival of the carrier at the line switch nearest the diverter junction of the receiving station, energizes the receiving relay 112 which in turn operates the receiving diverters of the local station.

110a, 111a and 112a indicate holding contactors for the respective relays 110, 111 and 12. If the receiving-preparing relay 110 is energized, its contactors 110b will connect the receiving relay 112 to the common control line $L_{13}$. Therefore, when one of the carrier-operated line switches 113 is actuated, relay 112 receives an energizing pulse going from $+L_2$ through said carrier-operated contactors 113, further through control line $L_7$, over contactors 110b and relay 112 to $+L_1$. Similarly, if relay 111 is energized, the receiving relay would operate only if the station-owned carrier-operated contactor 114 is operated. The latter is individually connected at each station, and therefore contactor 114 has no connection with a common control line L. 112c is a contactor on relay 112, one end of which is connected to cable line $L_9$. Similarly, 112d is a contactor which, when closed, connects $L_1$ to $L_{10}$, and contactor 112c connects $L_1$ to $L_{11}$. Lines $L_8$, $L_9$, $L_{10}$ and $L_{11}$ are alternative control lines by means of which the pump valves are alternatively adjusted to full-throttle blowing, half-throttle blowing, half-throttle suction, and quarter-throttle suction, all in accordance with the condition required for the receiving air flow at a particular station. In vertical plants the air-flow in the receiving phase of the transmission must be on half-throttle or quarter-throttle suction, to give a break to gravity drop. If, however, the station is in a branch of a horizontal main line, the receiving air-flow must be produced by positively blowing out the carrier.

In the exchange there is a relay 115 which, when energized by a carrier inserted in the tube, closes a contactor 115a which actuates the contact members 116a and 116b of a uniselector 116 to be moved to the next free position. Within the exchange there is such a uniselector 116 coordinated for each station. Every time a number call is completed on one of the line selectors 123b, the uniselector 117 is actuated, and with each movement of its members 117a and 117b one step forward it closes one of the relays 118 belonging to each of uniselectors 123. A relay 118 has also a break contactor 118a which disconnects voltage supply to cable line $L_{13}$ which is the supply line for all the holding solenoids 107 constituting a part of the station equipment at all stations. After completion of a dialling operation the relay 118 falls off, and cable line $L_{13}$ has again its voltage supply. This supply is only interrupted during the short period between the insertion of a carrier into the tube and the completion of the dialling operation at a given station.

In the exchange a relay 124 is in series with any of the receiving relays 110 and 111 and is thus energized as long as a transmission is going on. Only when a receiving-break contactor 126 in the station-owned unit is actuated by an arriving carrier will this relay 124 lose current, causing a contactor 124a to fall off, and as a result of this feeding the contact members 125a and 125b move one step forward.

The object of this whole arrangement is to enable transmissions to be preselected at more than one station during the period of transmission of a carrier, and to ensure furthermore that each transmission is started in turn in the same consecutive order in which it has been prepared at the respective sending stations.

Before a number can be dialled a carrier must be inserted at the sending station so high up that the line switch 104 closes contactor 105, so that relay 108 is energized, and when contactor 108a, solenoid 10 is energized and attracts armature 106 so that its hook is turned into the tube line. Thus, the carrier is held at this level, and the number of the desired station may be dialled. The relay 115 is in series with relay 107 and causes the contact members 116a and 116b of the uniselector 116 to move to the next free position.

After each dialling selection step switch 117a and 117b move one step forward they define a definite order of sequence for connecting up the sending stations with the line selectors 123. These selectors choose the receiving lines to the various stations, which lines lead to the receiving relays 110 or 111 respectively.

If the dialling is performed during the transmission of another carrier, the contactors of the line selectors carry no voltage, since this can only pass through the uniselector 125 which connects only a single line selector unit 123 at a time. Selector 125 does not step forward until a transmission in operation is completed, i.e. the relay 124 loses current. When this takes place selector 125 feeds one step forward, and twofold action is required to put the next transmission in sequence on its way. Firstly, the selector contact 125b connects to the selector contact 116b, the contact member being in the position corresponding to its position in the sequence of transmissions, and this energizes the sending relay 109 to cause the local diverter unit at the sending station to connect the main tube line with the branch tube line. Secondly, the selector unit 123 which comes in turn receives voltage through the uniselector 125, thus energizing the selected receiving-preparing relays 110 or 111. Other contactors (not shown) causes a pump to start, or a pump valve to open, resulting in an air stream flowing through the opening of the sending line. This will lift the carrier to enter the main tube line where it actuates the sending break switch 127, and the diverter return to its initial position. The carrier now moves to a routing plan on the principle explained in connection with FIGS. 1, 2 and 3.

A diverter gate unit as that shown in FIGS. 7, 8 and 9 may be modified so as to provide for more than two alternative junctions channels such as 2b and 2c. Such a unit would be constructed substantially on the same principle as that shown in FIGS. 7–9 with a double-bend tube but additional selective elements would have to be provided in order to increase the number of selectable alternating positions.

Figure 12:
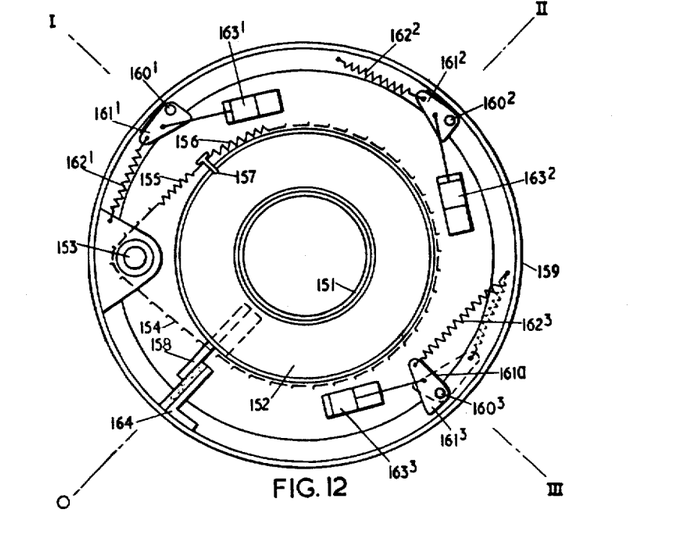
FIG. 12 is a modification of a diverter unit seen from the one side, and FIG. 13 the diverter of FIG. 12 partly in section.
Figure 13:
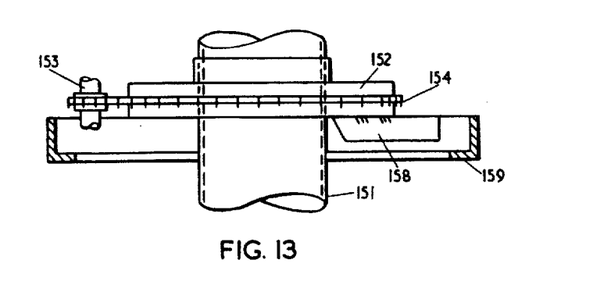

A modification of the diverter gate for procuring an increased number of selectable alternating positions is shown in FIGS. 12 and 13. FIG. 12 is a sectional view through the end of the double-bend tube on the left hand side of FIG. 7, where the axis of rotation of the double-bend, here numbered 151, coincides with the general axis of rotation of the device. FIG. 13 shows in side elevation the same end of the double-bend tube 151 with the means for a plurality of selectable alternating positions.

Concentrically on the tube end 151 is arranged a flanged metal drum 152 provided with a covering of frictional textile serving as a damping element during transitional drive movements. Around the periphery of the drum 152 there is arranged a belt or chain 154 which by means of tension springs 155 and 156 anchored together by a pin 157 is clamped around the drum and a pulley 153. The pulley is connected to an electromotor (not shown). In order to limit the rotation of the drum there is attached thereto a plate member 158.

An annular frame 159 forms a part of the cylindrical unit and constitutes its outer shell. This frame is provided with a plurality of interspaced rotation pins 160 in a number corresponding to the number of alternative junction positions to be provided for. In the example shown in FIG. 12 there are three such junction positions with pins numbered respectively $160^1$, $160^2$ and $160^3$. Each pin serves as fulcrum for bell crank lever in the shape of a triangle and numbered respectively $161^1$, $161^2$ and $161^3$. The long arm 161a of each of these levers is covered with a layer of felt on the one side thereof, and each arm is connected to the frame 159 by means of a spring $162^1$, $162^2$ and $162^3$ respectively. Between the point of attachment of the spring and the fulcrum pin each of the long lever arms is connected in such a manner to an electromagnet 163¹, 163² and 163³ respectively, that an actuation of the electromagnet imparts to the bell crank lever a displacement as indicated with dotted lines in connection with lever 161³. The dot-and-dash lines marked 0, I, II and III indicate the starting position and the three alternating junction positions respectively of the device. The starting position is determined by means of a stop 164 coacting with the plate member 158.

This diverter unit operates in the following manner. If the double-bend tube 151 is to be changed from starting position 0 into junction position III, a remote control signal is required to energize the electromagnet 163³ and at the same start the driving motor of the device. This causes the double-bend tube to rotate clockwise until plate 158 strikes the long arm of lever 161³. The motor current is interrupted before the unit reaches end position by means of any suitable cam action, and it absorbs its kinetic energy by tensioning the spring 155, 156 and through friction of the belt or chain 154 on the periphery of the drum 152. The return of the double-bend tube to starting position 0 is effectuated by simple change-over action of a relay to start the driving motor in reversed direction. At the same time arm 161³ is withdrawn into its non-operative position by means of its spring 162³.

I claim:

1. An installation, for the transmission of mail, or the like, in carriers propelled through pneumatic tubes, comprising a trunk tube line connected to at least one air pump having pump valves controlling the direction of flow, carriers for holding mail and moving through said line, a plurality of branch tube lines each having at least one message station capable of serving either as a dispatching station or as a destination station, each said branch tube line being connected to said trunk line by a diverter having several adjoining outlets and employing internal switching members for directing the carrier propelling air flow from said air pump normally passing only through the trunk line into a selected one of said several outlets, a plurality of first actuating devices located in said trunk line near each of said diverters for causing a carrier-operated signal, a plurality of second actuating devices located in or near the mouth of each of said message stations for causing a carrier-operated signal, an electrical control system including signalling means for marking out a desired message station as the destination station and also responsive to carrier-actuated, carrier position indicating signals arising from a carrier upon engagement with one of said first actuating devices to control the said pump valves and the diverters as to convey a mail carrier from any station of the installation to any other station, said electrical control system being operative in each individual transmission to provide a dispatch phase and a receiving phase which are sharply defined with respect to each other, said electrical control system including means which during the dispatch phase of a transmission electrically causes said pump valves to establish a pneumatic connection between the suction producing part of the pump and the trunk line while at the same time electrically setting the diverter which structurally joins the branch line having the dispatching station to the trunk line to establish pneumatic continuity between the tube mouth of the dispatching station and the said trunk line, said electrical control system further including means which during the receiving phase of a transmission is responsive to a carrier-operated signal derived from one of said first actuating devices to electrically cause said pump valves to establish a pneumatic connection between the pressure producing part of the pump and the trunk line, while at the same time electrically setting the diverters which structurally interconnect the trunk line via branch lines with the particular destination station selected and marked out by the electrical system to positions establishing a pneumatic connection between the trunk tube line and the tube mouth of said particular destination station, and means in said electrical control system actuated on receipt of another carrier-operated signal derived from one of said second actuating devices operative to return the electrical control system to an initial, neutral condition.

2. An installation as claimed in claim 1 in which the said second actuating devices disposed in or near the mouth of a station include means operative to provide the said electrical control system with a start indicating signal to commence the dispatch phase of a transmission when acted upon by a carrier inserted for dispatch, said second actuating devices further including means to provide the said electrical control system with a resetting signal concluding the receiving phase when acted upon by a carrier on receipt into the station.

3. An installation as claimed in claim 1 in which each said station is provided with a single tube terminal, whereby a carrier at the beginning of a dispatch phase and after the end of a receiving phase is respectively inserted into and ejected from the said single station tube terminal.

References Cited in the file of this patent

UNITED STATES PATENTS

| | | |
|---|---|---|
| 406,447 | Kennedy | July 9, 1889 |
| 489,932 | Clay | Jan. 17, 1893 |
| 974,799 | Jacques | Nov. 8, 1910 |
| 1,009,316 | Jennings | Nov. 21, 1911 |
| 1,753,987 | Hohne | Apr. 8, 1930 |
| 1,753,989 | Hohne | Apr. 8, 1930 |
| 1,838,208 | Appelius | Dec. 29, 1931 |
| 1,883,845 | Bauer | Oct. 18, 1932 |
| 2,710,728 | Halpern | June 14, 1955 |

FOREIGN PATENTS

| | | |
|---|---|---|
| 301,119 | Germany | Sept. 7, 1916 |

UNITED STATES PATENT OFFICE
CERTIFICATE OF CORRECTION

Patent No. 3,082,974                          March 26, 1963

John W. Halpern

It is hereby certified that error appears in the above numbered patent requiring correction and that the said Letters Patent should read as corrected below.

In the grant, lines 1 to 3, for "John W. Halpern, of Stockholm, Sweden," read -- John W. Halpern, of Stockholm, Sweden, assignor to The "Travel and Learn" Collegium of Advisers Fund S. A., of Luxembourg, --; line 12, for "John W. Halpern, his heirs" read -- The "Travel and Learn" Collegium of Advisers Fund S. A., its successors --; in the heading to the printed specification, lines 3 to 5, for "John W. Halpern, Stockholm, Sweden (% A/S De Forenede Patentbureauer, Vesterbrogade 31, Copenhagen V, Denmark)" read -- John W. Halpern, Stockholm, Sweden, assignor to The "Travel and Learn" Collegium of Advisers Fund S. A., Luxembourg --.

Signed and sealed this 5th day of May 1964.

(SEAL)
Attest:

ERNEST W. SWIDER                          EDWARD J. BRENNER
Attesting Officer                        Commissioner of Patents